US012646515B2

(12) United States Patent
Sharifi et al.

(10) Patent No.: US 12,646,515 B2
(45) Date of Patent: Jun. 2, 2026

(54) SELECTIVELY PROVIDING ENHANCED CLARIFICATION PROMPTS IN AUTOMATED ASSISTANT INTERACTIONS

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/244,762

(22) Filed: Sep. 11, 2023

(65) Prior Publication Data

US 2023/0419963 A1     Dec. 28, 2023

Related U.S. Application Data

(63) Continuation of application No. 17/122,875, filed on Dec. 15, 2020, now Pat. No. 11,756,544.

(51) Int. Cl.
| | |
|---|---|
| *G10L 15/22* | (2006.01) |
| *G06F 3/0481* | (2022.01) |
| *G06F 3/0488* | (2022.01) |
| *G06F 3/16* | (2006.01) |
| *G10L 15/18* | (2013.01) |
| *G10L 15/30* | (2013.01) |
| *G10L 25/51* | (2013.01) |

(52) U.S. Cl.
CPC ............ *G10L 15/22* (2013.01); *G06F 3/0481* (2013.01); *G06F 3/0488* (2013.01); *G06F 3/165* (2013.01); *G10L 15/1815* (2013.01);

*G10L 15/30* (2013.01); *G10L 25/51* (2013.01); *G10L 2015/223* (2013.01); *G10L 2015/228* (2013.01)

(58) Field of Classification Search
CPC ............................ G10L 15/22; G10L 2015/22
See application file for complete search history.

(56) References Cited

U.S. PATENT DOCUMENTS

| | | | |
|---|---|---|---|
| 9,008,490 B1 | 4/2015 | Sharifi | |
| 11,756,544 B2 * | 9/2023 | Sharifi | .................. G06F 3/0481 |
| | | | 704/257 |

(Continued)

*Primary Examiner* — Richemond Dorvil
*Assistant Examiner* — Alexander G Marlow
(74) *Attorney, Agent, or Firm* — Gray Ice Higdon

(57) ABSTRACT

Implementations described herein receive audio data that captures a spoken utterance, generate, based on processing the audio data, a recognition that corresponds to the spoken utterance, and determine, based on processing the recognition, that the spoken utterance is ambiguous (i.e., is interpretable as requesting performance of a first particular action exclusively and is also interpretable a second particular action exclusively). In response to determining that the spoken utterance is ambiguous, implementations determine to provide an enhanced clarification prompt that renders output that is in addition to natural language. The enhanced clarification prompt solicits further user interface input for disambiguating between the first particular action and the second particular action. Determining to provide the enhanced clarification prompt includes a current or prior determination to provide the enhanced clarification prompt instead of a natural language (NL) only clarification prompt that is restricted to rendering natural language.

16 Claims, 4 Drawing Sheets

(56) References Cited

U.S. PATENT DOCUMENTS

| 2006/0143007 | A1 | | 6/2006 | Koh | |
|---|---|---|---|---|---|
| 2007/0005369 | A1 | * | 1/2007 | Potter | G10L 15/063 |
| | | | | | 704/E15.04 |
| 2008/0275704 | A1 | * | 11/2008 | Portele | G10L 15/22 |
| | | | | | 704/E15.04 |
| 2012/0310954 | A1 | * | 12/2012 | Gaikwad | G06F 16/3323 |
| | | | | | 707/754 |
| 2014/0316764 | A1 | | 10/2014 | Ayan et al. | |
| 2015/0348555 | A1 | * | 12/2015 | Sugita | G10L 13/00 |
| | | | | | 704/243 |
| 2018/0211559 | A1 | * | 7/2018 | Hamilton, II | G06N 3/008 |
| 2018/0314689 | A1 | * | 11/2018 | Wang | G10L 15/1822 |
| 2020/0043488 | A1 | | 2/2020 | Park | |
| 2020/0193976 | A1 | | 6/2020 | Cartwright | |
| 2020/0304663 | A1 | * | 9/2020 | Kubota | G10L 15/22 |
| 2022/0189474 | A1 | | 6/2022 | Sharifi et al. | |

* cited by examiner

Figure 2:
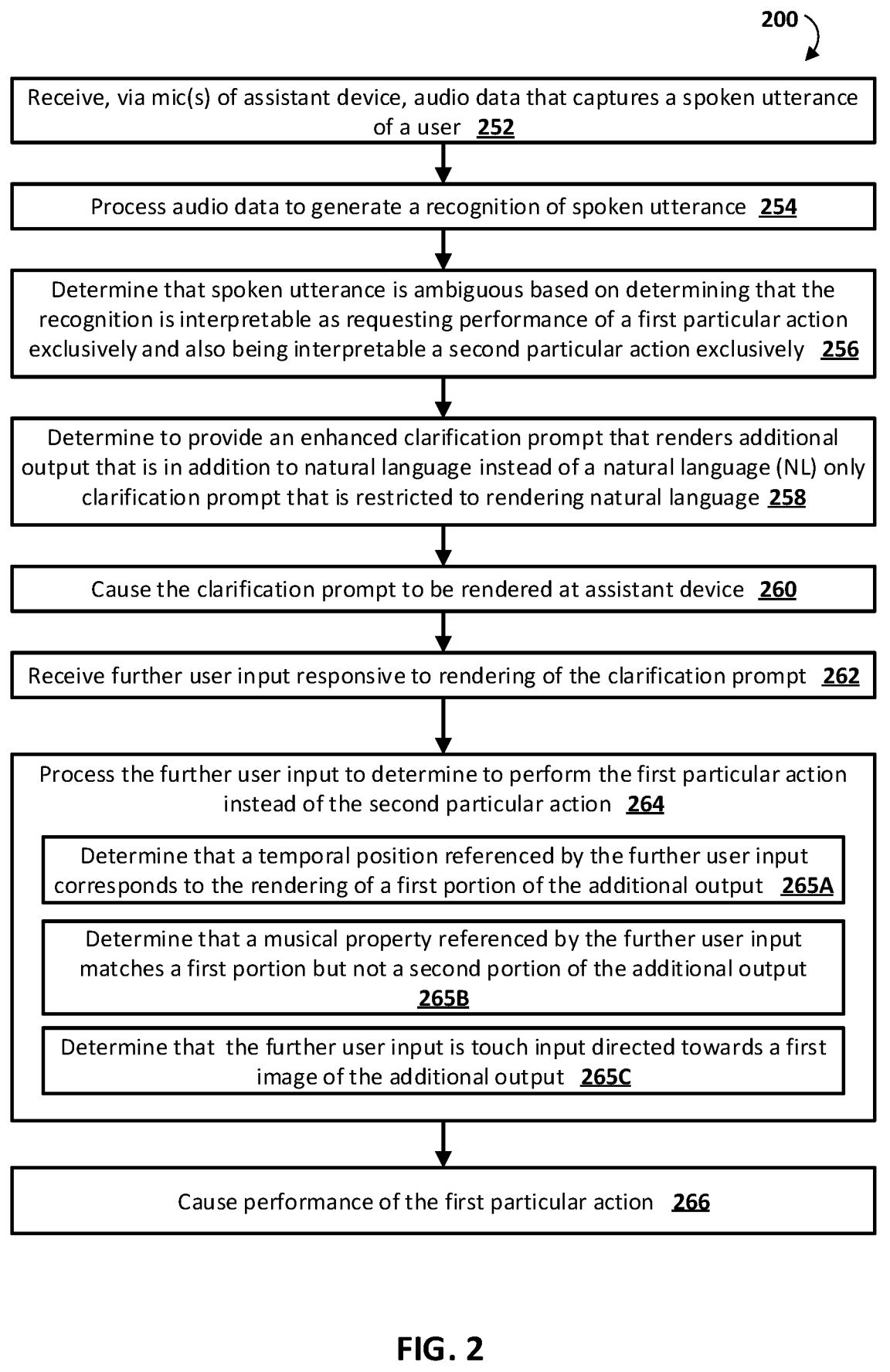

200

Receive, via mic(s) of assistant device, audio data that captures a spoken utterance of a user 252

↓

Process audio data to generate a recognition of spoken utterance 254

↓

Determine that spoken utterance is ambiguous based on determining that the recognition is interpretable as requesting performance of a first particular action exclusively and also being interpretable a second particular action exclusively 256

↓

Determine to provide an enhanced clarification prompt that renders additional output that is in addition to natural language instead of a natural language (NL) only clarification prompt that is restricted to rendering natural language 258

↓

Cause the clarification prompt to be rendered at assistant device 260

↓

Receive further user input responsive to rendering of the clarification prompt 262

↓

Process the further user input to determine to perform the first particular action instead of the second particular action 264

Determine that a temporal position referenced by the further user input corresponds to the rendering of a first portion of the additional output 265A

Determine that a musical property referenced by the further user input matches a first portion but not a second portion of the additional output 265B

Determine that the further user input is touch input directed towards a first image of the additional output 265C

↓

Cause performance of the first particular action 266

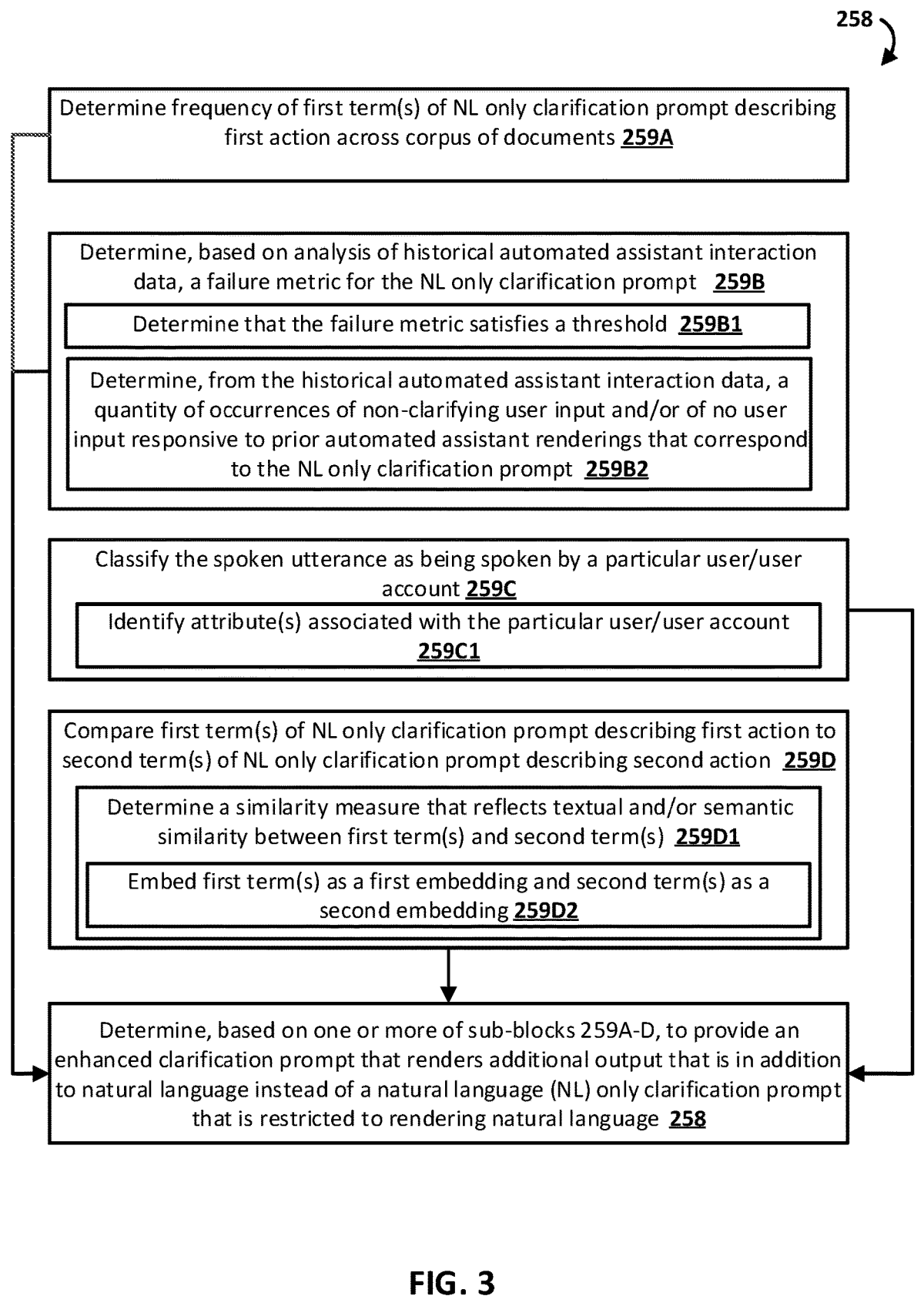

Determine frequency of first term(s) of NL only clarification prompt describing first action across corpus of documents 259A

Determine, based on analysis of historical automated assistant interaction data, a failure metric for the NL only clarification prompt 259B

Determine that the failure metric satisfies a threshold 259B1

Determine, from the historical automated assistant interaction data, a quantity of occurrences of non-clarifying user input and/or of no user input responsive to prior automated assistant renderings that correspond to the NL only clarification prompt 259B2

Classify the spoken utterance as being spoken by a particular user/user account 259C

Identify attribute(s) associated with the particular user/user account 259C1

Compare first term(s) of NL only clarification prompt describing first action to second term(s) of NL only clarification prompt describing second action 259D

Determine a similarity measure that reflects textual and/or semantic similarity between first term(s) and second term(s) 259D1

Embed first term(s) as a first embedding and second term(s) as a second embedding 259D2

Determine, based on one or more of sub-blocks 259A-D, to provide an enhanced clarification prompt that renders additional output that is in addition to natural language instead of a natural language (NL) only clarification prompt that is restricted to rendering natural language 258

FIG. 3

SELECTIVELY PROVIDING ENHANCED CLARIFICATION PROMPTS IN AUTOMATED ASSISTANT INTERACTIONS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed, and/or by providing textual (e.g., typed) natural language input. An automated assistant generally responds to a command or request by providing responsive user interface output (e.g., audible and/or visual user interface output), controlling smart device(s), and/or performing other action(s).

Typically, automated assistants are configured to perform a variety of actions, e.g., in response to a variety of command and request grammars to which the actions are mapped. These actions can include things like ordering items (e.g., food, products, services, etc.), playing media (e.g., music, videos), modifying a shopping list, performing home control (e.g., control a thermostat, control one or more lights, etc.), answering questions, booking tickets, and so forth. While natural language analysis and semantic processing enable users to use slight variations in their commands, these variations may only stray so far before natural language analysis and/or other semantic processing are unable to determine which action to perform. Likewise, natural language analysis and semantic processing may be unable to determine which content should be provided in response to a user request. Consequently, if a user issues an ambiguous command or request that can be potentially responded to in multiple ways, the personal assistant module may need to solicit additional information from the user to determine how to proceed.

SUMMARY

Implementations described herein relate to selectively (i.e., only when certain condition(s) are satisfied) causing rendering of an enhanced clarification prompt, rather than merely rendering a natural language-only ("NL only") clarification prompt. The rendering of the enhanced clarification prompt can be in response to determining that a spoken utterance of a user requests performance of one responsive action for which an automated assistant system has identified two or more candidate responsive actions.

An NL only clarification prompt is an audible and/or textual prompt that includes only natural language and that prompts the user to select between two or more candidate responsive actions or to otherwise provide more details about their request that may assist the system in selecting between the candidate responsive actions. The natural language, of the NL only clarification prompt, can include a characterization of the candidate responsive actions and/or their expected results, in order to assist the user in differentiating between the options. An enhanced clarification prompt includes output that is in addition to or in lieu of natural language, and can prompt the user to select between the candidate responsive actions or to otherwise provide more details about their request that may assist the system in selecting between the candidate responsive actions. The output that is in addition to or in lieu of natural language can include audio and/or visual content, such as musical snippet (s), image(s), and/or video(s) that can enable efficient differentiation between the candidate responsive actions.

As one example, assume a user utterance of "Play Hypothetical Song", and assume that "Hypothetical Song" is the name of a first song by "First Hypothetical Artist" and is also the name of a distinct second song by "Second Hypothetical Artist". The utterance can be captured in audio data and processed, using automatic speech recognition, to generate a recognition of the utterance. Further, the recognition can be processed, using natural language understanding, to determine that the spoken utterance is ambiguous in that it is interpretable as requesting rendering of the first song exclusively and is also interpretable as requesting rendering of the second song exclusively. In response to determining the spoken utterance is ambiguous, an enhanced clarification prompt can be rendered such as an enhanced clarification prompt that includes a first snippet of the first song and/or a second snippet of the second song and/or that includes a first image of "First Hypothetical Artist" and/or a second image of "Second Hypothetical Artist". For example, the enhanced clarification prompt can be "Do you want [rendering of first snippet] or [rendering of second snippet]". Continuing with the example, further user input can be received responsive to the rendering of the enhanced clarification prompt, and processed to determine whether to render the first song exclusively or to instead render the second song exclusively. For example, the further user input can be further spoken input and it can be compared to one or more first properties of the first action and/or one or more second properties of the second action in determining which it references. For instance, if the further user input is "the second one", the second action (rendering the second song) can be selected and implemented since "second" references the rendering order, in the enhanced clarification prompt, for the second snippet that corresponds to the second action. As another example, if the further user input is "the more upbeat one", the first action (rendering the first song) can be selected and implemented based on metadata associated with the first song indicating it is higher tempo than is the second song (as indicated by separate metadata associated with the second song). As yet another example, if the further user input is "the one with the acoustic guitar", the second action (rendering the second song) can be selected and implemented based on metadata associated with the second song indicating it includes an acoustic guitar and/or based on metadata associated with the first song indicating it does not include an acoustic guitar.

In many implementations, determining to provide the enhanced clarification prompt in response to the utterance is based on a current (i.e., in response to receiving the utterance) or prior (i.e., before receiving the utterance) determination to provide the enhanced clarification prompt in lieu of a NL only clarification prompt that is restricted to rendering natural language. The determination can be made based on determining one or more conditions are satisfied. Generally, the condition(s) can objectively indicate that provision of the NL only clarification prompt: is likely to result in prolonging of the interaction between the user and the automated assistant in disambiguating the user utterance (e.g., is likely to result in a further ambiguous input and/or a request for clarification of the NL only clarification prompt); is likely to lead to errant user input (e.g., due to a misunderstanding of the NL only clarification prompt and resulting in an incorrect disambiguation) that can cause errant performance of one or more automated assistant action(s) (e.g., errant and computationally wasteful rendering of the wrong song, errant and computationally wasteful purchasing of the wrong content, etc.); and/or is likely to lead to the user abandoning their intended goal (e.g., the user not responding at all due to not fully understanding the NL only clarification prompt). Accordingly, by considering the condition(s), enhanced clarification prompt(s) can be only selectively provided in those situations where doing so is likely to result in a shorter duration of interaction between a user and the automated assistant and/or is likely to lead to the user to provide correct disambiguating input, is likely to result in the user not abandoning their intended goal, and/or is likely to achieve additional and/or alternative technical benefit(s).

As one example, the determination to provide the enhanced clarification prompt in lieu of an NL only clarification prompt can be a prior determination made based on analysis of historical automated assistant interaction data. For example, if historical automated assistant interaction data indicates that the NL only clarification prompt (and/or or a group of similar NL only clarification prompt(s)) results in a threshold quantity of failures and/or results in failure with at least a threshold frequency, then it can be determined to provide the enhanced clarification prompt in lieu of the NL only clarification prompt. As a particular example, assume the NL only clarification prompt is "Do you want to hear the one by First Hypothetical Artist or the one by Second Hypothetical Artist?". The enhanced clarification can be chosen over the NL only prompt if historical automated assistant interaction data reflects a large quantity of occurrences of corresponding users not responding to instances of the NL only clarification prompt, responding with non-clarifying user input (e.g., "I don't know", "which is which", "huh", etc.), and/or choosing the incorrect one (e.g., as reflected by a quick cancelling of the rendering of the selected song, and optionally a subsequent request to play the non-selected song).

As another example, the determination to provide the enhanced clarification prompt in lieu of an NL only clarification prompt can be a current or a prior determination that is made based on comparing first term(s) that are descriptive of the first action to second term(s) that are descriptive of the second action. For example, if the comparison reflects at least a threshold degree of textual and/or semantic similarity between first term(s) and second term(s), it can be determined to provide the enhanced clarification prompt in lieu of the NL only clarification prompt. As one particular example, if the NL only clarification prompt is "do you want news about the actor John Doe or the producer John Doe", it can be determined that "actor" and "producer" satisfy a semantic similarity threshold. For instance, embeddings can be generated for "actor" and "producer" using a trained encoder (e.g., a trained neural network model), a distance between the "actor" embedding and the "producer" embedding determined, and the distance determined to satisfy the semantic similarity threshold. As a result, it can be determined to provide an enhanced clarification prompt instead, such as one that includes a first image of the actor and a second image of the producer.

As yet another example, the determination to provide the enhanced clarification prompt in lieu of an NL only clarification prompt can be a current or a prior determination that is made based on inverse document frequency (IDF) and/or other metric(s) for first term(s) that are descriptive of the first action and/or IDF and/or other metric(s) for second term(s) that are descriptive of the second action. For example, if the first term(s) and/or the second term(s) have a high IDF (i.e., are rare across a corpus of documents), then it can be determined to provide an enhanced clarification prompt instead of an NL only clarification prompt.

Various non-limiting examples of conditions that can be utilized in determining to provide an enhanced clarification prompt in lieu of an NL only clarification prompt have been described separately above. However, it is noted that a determination can be based on combinations of the above examples. For example, the determination to provide the enhanced clarification prompt in lieu of an NL only clarification prompt can be a current or a prior determination that is made based on IDF of first term(s) that are descriptive of the first action and/or based on IDF of second term(s) that are descriptive of the second action, and can also be based on a similarity measure that is based on a comparison of the first term(s) and the second term(s).

The preceding is provided only as an overview of some implementations. Those and other implementations are described in more detail herein, in the accompanying drawings and the description below.

BRIEF DESCRIPTION OF THE DRAWINGS

FIG. 2 is a flowchart illustrating an example method of requesting clarification in response to an ambiguous user command or request, in accordance with various implementations.

FIG. 3 is a flowchart illustrating an example method of determining to provide an enhanced clarification prompt instead of a natural language only clarification prompt, in accordance with various implementations.

DETAILED DESCRIPTION

Figure 1:
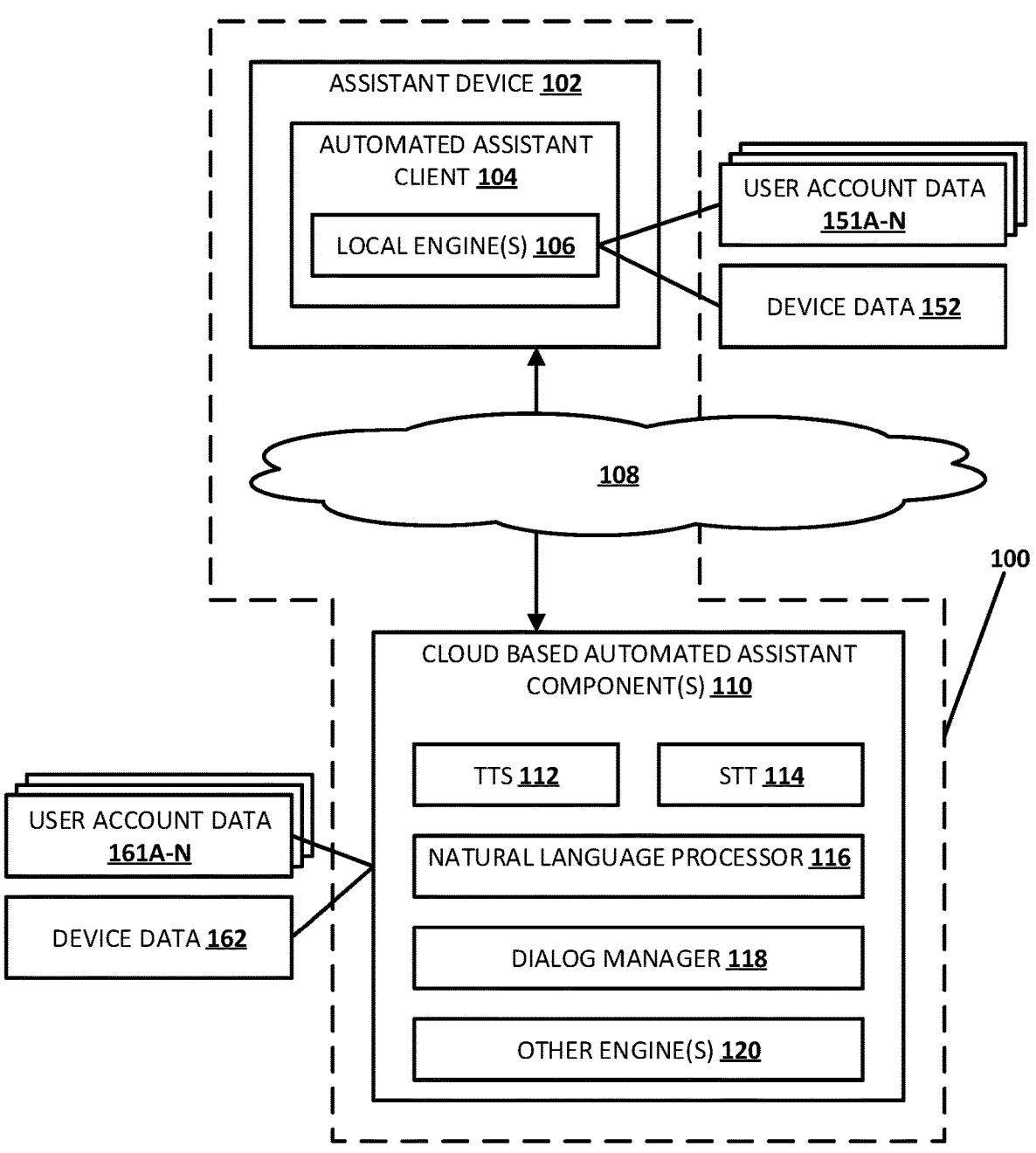
FIG. 1 is a block diagram of an example computing environment in which implementations disclosed herein may be implemented.

Turning initially to FIG. 1, an example environment is illustrated where various implementations can be performed. FIG. 1 includes an assistant device 102, which executes an instance of an automated assistant client 104. One or more cloud-based automated assistant components 110 can be implemented on one or more computing systems (collectively referred to as a "cloud" computing system) that are communicatively coupled to client device 102 via one or more local and/or wide area networks (e.g., the Internet) indicated generally at 108.

An instance of an automated assistant client 104, by way of its interactions with one or more cloud-based automated assistant components 110, may form what appears to be, from the user's perspective, a logical instance of an automated assistant 100 with which the user may engage in a human-to-computer dialog. An instance of such an automated assistant 100 is depicted in FIG. 1.

The assistant device 102 may be, for example: a desktop computing device, a laptop computing device, a tablet computing device, a mobile phone computing device, a computing device of a vehicle (e.g., an in-vehicle communications system, an in-vehicle entertainment system, an in-vehicle navigation system), a standalone interactive speaker, a smart appliance such as a smart television, and/or a wearable apparatus that includes a computing device (e.g., a watch having a computing device, glasses having a computing device, a virtual or augmented reality computing device). The assistant device 102 may be utilized by multiple users within a household, a business, or other environment. Some of those multiple users may be registered or verified with the shared assistant device 102 and have a corresponding user account accessible via the shared assistant device 102, while other user(s) may be viewed as guest users. Speaker recognition, facial recognition, and/or other technique(s) (e.g., pin entry) can be utilized to determine which of multiple user account(s) is interacting with the assistant 100 at a given time. Additional and/or alternative assistant devices may be provided.

In various implementations, the assistant device 102 may optionally operate one or more other applications that are in addition to automated assistant client 104, such as a message exchange client (e.g., SMS, MMS, online chat), a browser, and so forth. In some of those various implementations, one or more of the other applications can optionally interface (e.g., via an application programming interface) with the automated assistant 100, or include their own instance of an automated assistant application (that may also interface with the cloud-based automated assistant component(s) 110).

Automated assistant 100 engages in human-to-computer dialog sessions with a user via user interface input and output devices of the client device 102. To preserve user privacy and/or to conserve resources, in many situations a user must often explicitly invoke the automated assistant 100 before the automated assistant will fully process a spoken utterance. The explicit invocation of the automated assistant 100 can occur in response to certain user interface input received at the client device 102. For example, user interface inputs that can invoke the automated assistant 100 via the client device 102 can optionally include actuations of a hardware and/or virtual button of the client device 102. Moreover, the automated assistant client can include one or more local engines 106, such as an invocation engine that is operable to detect the presence of one or more spoken invocation phrases. The invocation engine can invoke the automated assistant 100 in response to detection of one of the spoken invocation phrases. For example, the invocation engine can invoke the automated assistant 100 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 100. As used herein, "invoking" the automated assistant 100 can include causing one or more previously inactive functions of the automated assistant 100 to be activated. For example, invoking the automated assistant 100 can include causing one or more local engines 106 and/or cloud-based automated assistant components 110 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 100.

The one or more local engine(s) 106 of automated assistant 100 are optional, and can include, for example, the invocation engine described above, a local speech-to-text ("STT") engine (that converts captured audio to text, and that is also referred to herein as an ASR engine), a local text-to-speech ("TTS") engine (that converts text to speech), a local natural language processor (that determines semantic meaning of audio and/or text converted from audio), and/or other local components. Because the client device 102 is relatively constrained in terms of computing resources (e.g., processor cycles, memory, battery, etc.), the local engines 106 may have limited functionality relative to any counterparts that are included in cloud-based automated assistant components 110.

Cloud-based automated assistant components 110 leverage the virtually limitless resources of the cloud to perform more robust and/or more accurate processing of audio data, and/or other user interface input, relative to any counterparts of the local engine(s) 106. Again, in various implementations, the client device 102 can provide audio data and/or other data to the cloud-based automated assistant components 110 in response to the invocation engine detecting a spoken invocation phrase, or detecting some other explicit invocation of the automated assistant 100.

The illustrated cloud-based automated assistant components 110 include a cloud-based TTS module 112, a cloud-based STT module 114, a natural language processor 116, a dialog manager 118, and one or more other engine(s) 120 which may include, for example, one or more engine(s) tasked with maintaining user account data $161A_{1-N}$, performing searches, and retrieving text, audio, or visual content for providing to the user (e.g., retrieving media content over the internet). In some implementations, one or more of the engines and/or modules of automated assistant 100 may be omitted, combined, and/or implemented in a component that is separate from automated assistant 100. In some implementations, automated assistant 100 may be implemented mostly or entirely on the assistant device 102 or in a particular ecosystem of assistant devices. For instance, one or more functions of the cloud-based automated assistant component(s) 110 described herein may be performed by one or more local engine(s) of one or more assistant devices 102 connected over a network. Further, in some implementations automated assistant 100 can include additional and/or alternative engines and/or modules.

Cloud-based STT module 114 can convert audio data into text, which may then be provided to natural language processor 116. Cloud-based TTS module 112 can convert textual data (e.g., natural language responses formulated by automated assistant 100) into computer-generated speech output. In some implementations, TTS module 112 may provide the computer-generated speech output to client device 102 to be output directly, e.g., using one or more speakers. In other implementations, textual data (e.g., natural language responses) generated by automated assistant 100 may be provided to one of the local engine(s) 106, which may then convert the textual data into computer-generated speech that is output locally. In some implementations, one or more of the components of automated assistant 100, such as natural language processor 116, TTS module 112, STT module 114, etc., may be implemented at least in part on assistant client devices 102 (e.g., to the exclusion of the cloud).

Natural language processor 116 of automated assistant 100 processes free form natural language input and generates, based on the natural language input, annotated output for use by one or more other components of the automated assistant 100. For example, the natural language processor 116 can process natural language free-form input that is textual input that is a conversion, by STT module 114, of audio data provided by a user via client device 102. The generated annotated output may include one or more annotations of the natural language input and optionally one or more (e.g., all) of the terms of the natural language input. As used herein, free-form natural language input is input that is formulated by a user and that is not constrained to a group of options presented for selection by the user. Free-form natural language input may be spoken (and captured by microphone of assistant client device 102) and/or typed (e.g., into one or more interfaces provided by one or more applications).

In some implementations, the natural language processor 116 is configured to identify and annotate various types of grammatical information in natural language input. In some implementations, the natural language processor 116 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 116 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 116 may rely on annotations from one or more other components of the natural language processor 116. In some implementations, in processing a particular natural language input, one or more components of the natural language processor 116 may use related prior input and/or other related data outside of the particular natural language input to determine one or more annotations.

Dialog manager 118 may be configured to map a representation of a user request to perform some action, e.g., using the annotations, to one or more "responsive actions" of a plurality of candidate responsive actions that are then performed by automated assistant 100. In some implementations, dialog manager 118 may have access to one or more databases (not depicted) that include, for instance, a plurality of mappings between grammars and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the assistant device 102 operated by the user. Another grammar, "[weather|forecast] today," may be match-able to user queries such as "what's the weather today" and "what's the forecast for today?" In some implementations, these mappings may include mappings between entities and candidate responsive actions that are performable in association with those entities.

In addition to or instead of grammars, in some implementations, dialog manager 118 may employ one or more trained machine learning models, alone or in combination with one or more grammars. These trained machine learning models may also be stored in one or more databases and may be trained to identify intents, e.g., by embedding data indicative of a user's utterance into a latent space, and then determining which other embeddings (and therefore, intents) are most proximate, e.g., using techniques such as Euclidean distance, cosine similarity, etc.

Various contextual signals may be used to perform various aspects of the natural language processing and dialog managing features described herein. For example, entity or entity type recognition, entity or entity type ranking, identification of candidate responsive actions associated with entities or entity types, ranking of candidate responsive actions, and/or filtering of candidate responsive actions, may be performed based on contextual signals. Contextual signals or "cues" associated with a user and/or a client device they operate may include, for instance, a location (e.g., determined using GPS, wireless triangulation, inertial measurement units, etc.), time of day, user preferences, calendar entries of the user, communications to/from the user (e.g., emails, direct messages, text messages, etc.), social networking activity, current user activity (e.g., exercising, flying, driving, ridesharing, etc.), applications that are installed or otherwise accessible to the user at any given moment, and state(s) of running applications, to name a few.

FIG. 1 also illustrates local user account data $151_{A\text{-}N}$ and local device data 152. The local user account data $151_{A\text{-}N}$ can include, for example, user account-specific settings, user account-specific preferences, and historical automated assistant interaction data descriptive of historical interactions between corresponding users and the automated assistant 100 for various user accounts that are associated with the assistant device 102. The local user account data $151_{A\text{-}N}$ can additionally or alternatively include, for example, accessibility data for each of multiple user accounts (e.g., $151_A$ can include indications of association(s) that are accessible to a first user account, $151_B$ can include indication(s) of association(s) that are accessible to a second user account, etc.). Some of the accessibility data can be applied to corresponding local user account data utilizing techniques described herein. In processing a spoken utterance from a given user, local engine(s) 106 (e.g., local STT and/or natural language processing engine(s)) can utilize such accessibility data for one of the user account data $151_{A\text{-}N}$ that corresponds to the given user. The local device data 152 can include settings, preferences, and historical automated assistant interaction data that is applicable to the shared assistant device 102 as a whole. The local engine(s) 106 of the assistant device 102 can use the local user account data $151_{A\text{-}N}$ and local device data 152 to perform one or more natural language processing or dialog managing functions described herein.

FIG. 1 also illustrates cloud user account data $161_{A\text{-}N}$ and cloud device data 162. The cloud user account data $161_{A\text{-}N}$ can be similar to (e.g., the same as) the local user account data $151_{A\text{-}N}$ described above, but is utilized by the cloud based automated assistant component(s) 110 instead of the local engine(s) 106. In some implementations, the cloud user account data 161A-N may additionally include user account data and/or historical automated assistant interaction data for a plurality of users of the automated assistant 100 via one or more other assistant devices. The cloud device data 162 can also be similar to (e.g., the same as) the local device data 152 described above, but is utilized by the cloud based automated assistant component(s) 110 instead of the local engine(s) 106. For example, the cloud based automated assistant component(s) 110, in processing an utterance provided at the assistant device 102, can receive an identifier of the assistant device 102 and utilize that identifier in accessing the corresponding cloud device data 162 for the assistant device 102. In some implementations, the cloud device data 162 may additionally include user device data for a plurality of assistant devices of other users of the automated assistant 100.

Responsive actions may come in a variety of forms, depending on the user request. Responsive actions may be any action that an automated assistant is capable of performing and/or invoking. Some responsive actions may be used to control appliances and/or other Internet of Things ("IoT") devices, such as lights, locks, thermostats, televisions, speakers, smart blinds, cameras, toys, and so forth. Some responsive actions may be used to procure items such as products, tickets, food (e.g., ordering pizza), etc. Some responsive actions may be applications or "apps" that may be invoked by automated assistants, e.g., with various fields pre-populated based on the free-form natural language input. Some responsive actions may include retrieval of responsive data and provision of that responsive data to the user in audio and/or visual form, e.g., in response to search queries. Some responsive actions may be "intra-app" actions that are performable within an application, such as starting or stopping monitoring of exercise, pausing/playing media files, sharing locations and/or estimated time of arrival (e.g., via a rideshare or cycling app), altering a destination (e.g., via a rideshare app), and so forth. In the latter case, an application programming interface ("API") may be exposed to an automated assistant directly and/or via an operating system ("OS"), which enables the automated assistant to perform actions within an application.

If more than one candidate responsive action is identified for a given user request, then dialog manager 118 may use data associated with the candidate responsive actions and the data generated by the natural language processor 116 to clarify which candidate responsive action the automated assistant 100 should perform based on the user request. Dialog manager 118 may be configured to determine the candidate responsive actions (or the intents indicating the candidate responsive actions) based on the data received from natural language processor 116. Dialog manager 118 may use the various data generated by the natural language processor 116, as well as information retrieved from user account data 161$_{A-N}$, device data 162, or one or more other databases (e.g., over the internet), to identify the multiple responsive actions and generate one or more clarification prompts for presentation to the user. For example, a user may provide a spoken utterance of "Play Boxanne". The automated assistant 100 may process the spoken utterance and determine that "Boxanne" is the name of a song, but may be unable to determine if the user wants to listen to the generally more popular, older version by a band called "the Firefighters" or the newer version by the artist "Arkansas Vegas" which has started trending in the past few days. As another example, a user may provide a spoken utterance of "how tall is a crane?". The automated assistant 100 may process the spoken utterance and determine that "crane" is equally likely to correspond to two different candidate responsive actions consisting of presenting information about a height of industrial machinery frequently used to hoist large objects and presenting information about a height of a long-necked bird species of the Gruiform order of birds.

When the automated assistant 100 determines more than one candidate responsive action corresponds to the spoken utterance, dialog manager 118 may provide one of a natural-language ("NL") only clarification prompt and an enhanced clarification prompt for presentation to the user depending on various factors described herein. The clarification prompts present the candidate responsive actions as options to the user and prompt the user to provide clarifying user input in response to the prompt that may be used to disambiguate between the options.

An NL only clarification prompt is an audible and/or textual prompt generated to imitate a spoken natural language question or statement that prompts the user to select between the candidate responsive actions or to otherwise provide more details about their request that may assist the system in selecting between the candidate responsive actions. The NL only clarification prompt includes only natural language, such as a natural language characterization of the candidate responsive actions and/or their expected results, in order to assist the user in differentiating between the options. An enhanced clarification prompt includes additional audio or visual content instead of, or in addition to, natural language and, likewise, prompts the user to select between the candidate responsive actions or to otherwise provide more details about their request that may assist the system in selecting between the candidate responsive actions. The additional audio or visual content may include portions of the various media corresponding to the candidate responsive actions or may otherwise characterize the candidate responsive actions or the expected results of the candidate responsive actions (e.g., an image of a musical note and an image of a projector presented to help the user choose between a song and a movie).

In keeping with the "Boxanne" example above, an NL only clarification prompt from the system may include audio data imitating the natural language question "Did you want the one by the Firefighters or the one by Arkansas Vegas?". Whereas, for such an example, an enhanced clarification prompt may be "Do you want this one [insert sound clip #1] or this one [insert sound clip #2]?", where the [sound clips] are representative audio snippets of the two versions of the song "Boxanne". A representative audio snippet of a song can, for example, be from a chorus of the song (e.g., as indicated by metadata), be a portion of the song that includes term(s) from the title of the song (e.g., as determined using ASR or other technique(s)), and/or be from some other well known part of the song (e.g., a portion that is consumed more often than other portions and/or is often consumed at a higher volume than other portions). In keeping with the "how tall is a crane?" example above, an NL only clarification prompt from the system may include audio data imitating the natural language question "Do you mean the machinery or the Gruiform?". Whereas, for such an example, an enhanced clarification prompt may include the question "Which type of crane did you mean?" with an image of the industrial equipment called a crane and an image of the long-necked bird called a crane displayed on a display of the assistant device.

The NL only clarification prompt can be generated based on an NL only clarification prompt template. The NL only clarification prompt template may be pre-generated, or may be generated responsive to identifying the two or more candidate responsive actions as corresponding to the user's spoken utterance. The NL only clarification prompts can include slots filled by the natural language characterizations of the candidate responsive actions to be rendered in the prompt. The system may generate such natural language characterizations of the candidate responsive actions based on data generated during the natural language processing and, in some implementations, information retrieved from one or more other resources available to the system (e.g., user search or browser history, user account profile, historical user data of a plurality of users of the system, user-device resources, online resources, etc.).

In some implementations, an NL only clarification prompt may be the default clarification prompt used when the automated assistant 100 determines it cannot select between two or more candidate responsive actions for user requests generally, or for certain types of user requests. However, the automated assistant 100 may instead select an enhanced clarification prompt based on a variety of factor(s)/condition (s) described herein. In other implementations, there may be no default type of clarification prompt to provide for the user request and/or identified candidate responsive actions, and the variety of factors described herein may lead to the automated assistant 100 determining to provide an enhanced clarification prompt rather than an NL only clarification prompt.

FIG. 2 is a flowchart illustrating an example method 200 of disambiguating a user request. For convenience, the operations of the flow chart are described with reference to a system that performs the operations. This system may include various components of various computer systems, such as one or more components of automated assistant 100. Moreover, while operations of method 200 are shown in a particular order, this is not meant to be limiting. One or more operations may be reordered, omitted or added.

At block 252, the system receives, via microphone(s) of an assistant device, audio data that captures a spoken utterance of a user.

At block 254, the system processes the audio data to generate a recognition that corresponds to the spoken utterance. The processing may include generating a transcription of the spoken utterance and performing various natural language processing functions, such as generating annotations of the transcription, as described herein.

In some implementations, generating a recognition may further include voice recognition, e.g., matching a voice detected in the audio data to one or more voice recognition profiles of the user account associated with the user. In such implementations, the spoken utterance may be classified as being spoken by the user associated with the user account including the matching voice recognition profile(s). In some implementations, the system can attribute the spoken utterance to the particular user or user account based on historical automated assistant interaction data that indicates receipt of the spoken utterance is likely associated with that user and/or account. For example, the historical automated assistant interaction data may indicate that the assistant device that received the spoken utterance has historically been mainly, only, or most recently used by a particular user or account.

At block 256, the system determines, based on processing the recognition that corresponds to the spoken utterance, that the spoken utterance is ambiguous. The system determines that the spoken utterance is ambiguous based on determining that the recognition is interpretable as requesting performance of a first particular action exclusively and also being interpretable a second particular action exclusively. In the "Play [Boxanne]" example described above, even though it is clear from the user's spoken utterance that they wish for only one instance of the song [Boxanne] to begin playing, the system is unable to determine if it should perform the action corresponding to the request "Play [Boxanne] by [the Firefighters]" or instead perform the action corresponding to the request "Play [Boxanne] by [Arkansas Vegas]". When the system encounters such a situation, it will provide a clarification prompt to the user requesting clarifying details that may be used to disambiguate between the two candidate responsive action options.

At block 258, the system determines to provide an enhanced clarification prompt that renders additional output that is presented instead of or in addition to natural language, in lieu of a natural language (NL) only clarification prompt that is restricted to rendering natural language. The determination can be made based on determining one or more conditions are satisfied. Generally, the condition(s) can objectively indicate that provision of the NL only clarification prompt: is likely to result in prolonging of the interaction between the user and the automated assistant in disambiguating the user utterance (e.g., is likely to result in a further ambiguous input and/or a request for clarification of the NL only clarification prompt); is likely to lead to errant user input (e.g., due to a misunderstanding of the NL only clarification prompt and resulting in an incorrect disambiguation) that can cause errant performance of one or more automated assistant action(s) (e.g., errant and computationally wasteful rendering of the wrong song, errant and computationally wasteful purchasing of the wrong content, etc.); and/or is likely to lead to the user abandoning their intended goal (e.g., the user not responding at all due to not fully understanding the NL only clarification prompt). Accordingly, by considering the condition(s), enhanced clarification prompt(s) can be only selectively provided in those situations where doing so is likely to result in a shorter duration of interaction between a user and the automated assistant and/or is likely to lead to the user to provide correct disambiguating input, is likely to result in the user not abandoning their intended goal, and/or is likely to achieve additional and/or alternative technical benefit(s).

In some implementations, block 258 can include one or more of sub-blocks 259A-D (see FIG. 3), in which the system determines to provide the enhanced clarification prompt instead of the NL only clarification prompt based on one or more of these factors discussed in more detail below with respect to FIG. 3. In some implementations, the determination of block 258 may be a prior determination made prior to receiving the audio data that captures the spoken utterance of the user at block 252. In some implementations, the determination of block 258 may be a current determination made subsequent to generating the recognition of the spoken utterance at block 254 or determining that the spoken utterance is ambiguous at block 256.

At block 260, the system causes the clarification prompt to be rendered at an assistant device. In some implementations, causing the clarification prompt to be rendered at an assistant device includes modifying data at one or more automated assistant servers to cause the NL only clarification prompt to be supplanted by the enhanced clarification prompt.

In some implementations, the clarification prompt is rendered at the same device which received the audio data from the user. In some implementations, the system selects another assistant device to provide the clarification prompt based on the received audio data, additional sensor data generated based on one or more sensors of the assistant device, information included in a user account, the additional output that is to be included in the clarification prompt, the type of user input expected to be received in response to the clarification prompt, and the candidate responsive actions. For example, a particular assistant device that includes a screen may be selected based on identifying an indication in the user account profile associated with the assistant device that received the audio data that the particular assistant device is a main or preferred assistant device, detecting that the user was moving in the direction of the particular assistant device when they spoke the spoken utterance, determining that the additional output includes images that need to be rendered on a display such as one included in or connected to the particular assistant device, or determining that a user wish to respond to a clarification prompt including images by performing a touch input on a touch display such as one included in or connected to the particular assistant device.

At block 262, the system receives further user input responsive to the rendering of the clarification prompt. The further user input may be spoken input, textual input, touch input, or electronic signal input from an additional electronic device provided to the assistant device that received the initial spoken utterance, the assistant device that rendered the clarification prompt, or another assistant device communicatively coupled to the assistant device that received the initial spoken utterance or the assistant device that rendered the clarification prompt.

At block 264, the system processes the further user input to determine to perform the first particular action instead of the second particular action. In the case of touch input, the system may determine to perform the first particular action instead of the second particular action based on identifying a location on the display that was indicated by the touch input and that corresponds to a location at or closest to where one of the two or more characterizations of the options presented to the user was rendered. In the case of spoken input or textual input, a recognition or transcription may be generated, as discussed above with respect to the initial spoken utterance, and the system may perform natural language processing to determine which option of the two or more options rendered that correspond to candidate responsive actions the spoken input corresponds to, if any. In the case of electronic signal input received from an additional electronic device, the system may determine number(s), letter(s), word(s), phrase(s), location(s) on the display, or temporal location(s) of the input received with respect to the prompt (e.g., after the first option is presented but before the second option is presented) that correspond to the electronic signal input in order to identify which presented option the further user input corresponds to.

For some of these forms of further user input, the system can compare one or more properties indicated by the further user input to one or more properties associated with the candidate responsive actions corresponding to the renderings in the clarification prompt. The one or more properties associated with the candidate responsive actions corresponding to the renderings in the clarification prompt may be obtained, for example, from a knowledge graph or one or more other outside resources available to the system, e.g., over the internet. One or more properties associated with a candidate responsive action and/or with media presented in an enhanced clarification prompt can additionally or alternatively be determined (in advance or "live") using one or more machine learning models. For example, a property of an image presented in an enhanced clarification prompt can include term(s) from a caption generated automatically by processing the image using a machine learning model and/or a property of a representative audio snippet of a song presented in an enhanced clarification prompt can include term(s) from the snippet of the song that are automatically determined based on performing ASR on the snippet of the song. The one or more properties may include properties of the candidate responsive actions, properties of the media presented to the user in the rendering of the enhanced clarification prompt (e.g., descriptors of: content or type of content included in or with the audio/video snippets or images, the general or relative location on the display, the temporal positions of given media renderings, the source of the media used in the renderings, etc.), properties of one or more entities, services, devices, and/or previous interactions with the automated assistant that are associated with the candidate responsive actions or the content included in the renderings (e.g., "the one I played on Music App last night", "the one by the artist with black hair", "the one that I downloaded to my offline playlist on my phone", etc.), or combinations thereof.

In some implementations, at block 264, the system may process the further user input to identify a semantic property (e.g., "upbeat", "new", "black hair", etc.) that is referenced by the further user input. In such implementations, the system can generate an embedding based on the identified semantic property (e.g., using a trained neural network encoder) and compare the embedding to a plurality of embeddings of respective semantic properties associated with the candidate responsive actions corresponding to the renderings of the clarification prompt. The plurality of embeddings of respective semantic properties associated with the candidate responsive actions may have been generated by the trained neural network encoder or another trained neural network encoder based on metadata that indicates semantic properties associated with the candidate responsive actions. Further, the system can determine that the given semantic property matches, or most closely matches, a given embedding, of the plurality of embeddings of the respective semantic properties, based on the comparison. For example, assume the embeddings are word2vec representations. In this example, a cosine distance between the word2vec representation of the semantic property and each of the word2vec representations of the respective semantic properties of the candidate responsive actions of the prompt can be determined, and a given semantic property of a candidate responsive action that is associated with a respective cosine distance that satisfies a distance threshold can be utilized to determine the semantic property of the spoken utterance matches, or most closely matches, the given semantic property that is associated with a given candidate responsive action (e.g., an exact match or "fuzzy" match). As a result, the given candidate responsive action that is associated with the given semantic property may be selected for performance.

In some implementations, block 264 may include one or more of sub-blocks 265A, 265B, or 265C, depending on the type of content included in the clarification prompt and/or the type of input that was provided by the user in response to the clarification prompt.

The system may determine, at block 265A, that the further user input references a temporal position of a particular portion of the additional output. In keeping with the "Boxanne" example above, the system renders the enhanced clarification prompt. For example, the enhanced clarification prompt can be "Do you want this one [insert sound clip #1] or this one [insert sound clip #2]?", where the [sound clips] are representative audio snippets of the two versions of the song "Boxanne". As another example, the enhanced clarification prompt can be "Do you want [Label #1] [insert sound clip #1] or [Label #2] [insert sound clip #2]?", where the [sound clips] are again representative audio snippets of the two versions of the song "Boxanne", where [Label #1] includes a property (e.g., artist, release date, genre) of the first version of the song that is not also a property of the second version of the song, and where [Label #2] includes a property of the second version of the song that is not also a property of the first version of the song. Providing, in the enhanced clarification prompt, a unique label for one or more of the options can teach users about distinction(s) between the options and/or can provide an explicit cue for further user input that can be used to differentiate between the options. Responsive to this rendering, the user provides further user input in the form of a spoken utterance of "the first one". Block 265A may be performed, and the first action (rendering the first song) can be selected and implemented since "first" references the rendering order, in the enhanced clarification prompt, for the first song snippet that corresponds to the first action.

The system may determine at block 265B that the further user input of the user references a musical property associated with a portion of the clarification prompt corresponding to a rendering of particular candidate responsive action and not corresponding to the rendering of the other particular candidate responsive actions. For example, when the system receives a responsive spoken utterance of "the more upbeat one" or "I want the vegan doom-metal version", then block 265B may be performed. In some implementations, the determination(s) of block 265B may be performed based on comparing the musical property referenced by the further user input to metadata associated with the first and second candidate responsive actions and/or their renderings in the clarification prompt. Thus, for example, after rendering two different representative audio snippets corresponding to two different songs in the clarification prompt, the system may select and implement the first action (rendering the first song) based on metadata associated with the first song indicating it is higher tempo than is the second song, as indicated by separate metadata associated with the second song. As yet another example, if the further user input is "the one with the acoustic guitar", the second action (rendering the second song) can be selected and implemented based on metadata associated with the first song indicating it includes an acoustic guitar and/or based on metadata associated with the second song indicating it does not include an acoustic guitar.

The system may determine at block 265C that the further user input of the user corresponds to a rendering of a particular candidate responsive action consisting of an image. For example, when the system receives a touch input corresponding to a location on a touchscreen of an image corresponding to a particular candidate responsive action, then block 265C may be performed.

At block 266, the system causes performance of the first particular action.

Turning now to FIG. 3, it is a flowchart illustrating example implementations of block 258 of FIG. 2.

At block 259A, the system determines a frequency of occurrence, of at least one term of one or more terms of the NL only clarification prompt that describes a first candidate responsive action, across a corpus of documents. The NL only clarification prompts can include slots filled by the natural language characterizations of the candidate responsive actions to be rendered in the prompt. The system may generate such natural language characterizations of the candidate responsive actions based on data generated during the natural language processing and, in some implementations, information retrieved from one or more other resources available to the system. Each natural language characterization for a candidate responsive action includes one or more terms describing that candidate responsive action.

The NL only clarification prompt can be generated based on an NL only clarification prompt template. The NL only clarification prompt template may be pre-generated, or may be generated responsive to identifying the two or more candidate responsive actions as corresponding to the user's spoken utterance. In the case of pre-generated NL only clarification prompt templates, the NL only clarification prompt template can be selected from among various NL only clarification templates based on the identified two or more candidate responsive actions that correspond to the user's spoken utterance. For example, there may be NL only clarification prompt templates for online shopping, viewing or retrieving media content, interactions with a restaurant reservation application, booking flights, etc. There may also be NL only clarification prompt templates for the various combinations of such actions, e.g., a clarification prompt for selecting between an online shopping action and a flight booking action. In some implementations, the NL only clarification prompt template may be selected from among various NL only clarification templates at least in part based on the natural language characterizations of the candidate responsive actions to be rendered in the prompt. For example, if the clarification prompt is to include natural language characterizations of candidate responsive actions that are detailed and/or long-winded, then an NL only clarification prompt template that includes long pauses before and/or after the characterizations or that provides a summary at the end may be selected. In implementations in which the NL only clarification prompt template is generated after receiving the spoken utterance, it may likewise be tailored to the candidate responsive actions and/or their characterizations that are to be rendered in the clarification prompt.

The system, at block 259A, determines the frequency at which one or more of the terms of the natural language characterizations of the candidate responsive actions occur in a corpus of documents. The system can use this frequency to determine to provide the enhanced clarification prompt rather than the NL only clarification prompt. In some implementations, the frequency determined at block 259A may be an inverse document frequency (IDF). In such implementations, one or more of the first terms or the second terms will have a high IDF if they occur rarely across the corpus of documents. In various implementations, the corpus of documents may be selected based on the respective candidate responsive action described by the term(s), based on the one or more terms describing the respective candidate responsive action, and/or based on a user account associated with the user that provided the spoken utterance.

In some implementations, the system may determine, at block 258, to provide the enhanced clarification prompt when one or more of the terms occur frequently in the corpus of documents, e.g., indicating the term(s) may describe several unrelated actions or concepts. In some implementations, the system may determine to provide the enhanced clarification prompt when one or more of the terms occur infrequently in the corpus of documents, e.g., indicating the term(s) may be uncommon ways of characterizing the first candidate responsive action and/or that the user is unlikely to be familiar with the term(s). In keeping with the "how tall is a crane?" example above, an NL only clarification prompt from the system may include audio data imitating the natural language question "Do you mean the machinery or the Gruiform?". Whereas, for such an example, an enhanced clarification prompt may include the question "Which type of crane did you mean?" with an image of the industrial equipment called a crane and an image of the long-necked bird called a crane displayed on a display of the assistant device. In this example, the system may determine, at block 258, to provide the enhanced clarification prompt in lieu of the NL only clarification prompt based on determining that one or more metrics associated with the term "Gruiform" indicate that it is unlikely to be recognized and/or understood. For example, the metric(s) can include that it has a high IDF within a relevant corpus of documents, that it has never been utilized by the user (e.g., in search(es), email(s), and/or other user input(s)), and/or that it has been utilized by the user less than a threshold quantity of times.

At block 259B, the system determines, based on an analysis of historical automated assistant interaction data, a failure metric for an NL only clarification prompt generated and/or selected as described above with respect to block 259A. The historical automated assistant interaction data employed at block 259B may be historical automated assistant interaction data of the user, e.g., from local or remote user account databases 151A-N and 161A-N, and/or historical automated assistant data for a population of user, e.g., from remote user account database 161A-N or another remote user account database accessible to the system. The NL only clarification prompt, a portion of the NL only clarification prompt (e.g., the natural language characterization of a candidate responsive action or the template), or portion(s) of an NL only clarification prompt including similar features (e.g., pauses between option presentations or types of descriptors used in the natural language characterizations) may have been provided to one or more users previously, and the system may analyze the interactions between the user(s) and the automated assistant occurring shortly before and shortly after presentation of the clarification prompt to determine a failure metric for the prompt.

Block 259B can include one or more of sub-blocks 259B1 and 259B2. At sub-block 259B1, the system determines that the failure metric satisfies a threshold. In various implementations, the failure metric is a total number of failures, a total number of failures within a time period, a failure rate, or some combination thereof.

At sub-block 259B2, the system determines, from the historical automated assistant interaction data (for the user and/or a population of users), a quantity of occurrences of non-clarifying user input and/or of no user input responsive to prior automated assistant renderings that correspond to the NL only clarification prompt. Prior automated assistant renderings that correspond to the NL only clarification prompt can include those that strictly conform to the NL only clarification prompt, those that utilize the same template as the NL only clarification prompt, those that reference one or more of the same genre(s) and/or artist(s) of the NL only clarification prompt, those that include one or more of the same term(s) as the NL only clarification prompt, and/or those that otherwise correspond to the NL only clarification prompt. Accordingly, metric(s) determined at sub-block 259B2 can be specific to the particular NL only clarification prompt and/or can be applicable to multiple NL only clarification prompts (e.g., those generated using the same template, those referencing the same artist(s), etc.), including the particular NL only clarification prompt. For example, the system may identify occurrences in which no user input was provided in response to the clarification prompt, portions of the clarification prompt, or portions of clarification prompts containing similar features or occurrences in which the user input provided in response to the clarification prompt, portions of the clarification prompt, or portions of clarification prompts containing similar features cannot be resolved as corresponding to any one natural language characterization corresponding to a candidate responsive action.

For example, assume the NL only clarification prompt is "Do you want to hear the one by First Hypothetical Artist or the one by Second Hypothetical Artist?". The enhanced clarification can be chosen over the NL only prompt at block 258 if historical data reflects a large quantity of occurrences of corresponding users not responding to instances of the NL only clarification prompt (or similar NL only clarification prompts), responding with non-clarifying user input (e.g., "I don't know", "which is which", "huh", etc.), and/or choosing the incorrect one (e.g., as reflected by a quick cancelling of the rendering of the selected song, and optionally a subsequent request to play the non-selected song). The system can thus determine to provide the enhanced clarification prompt rather than the NL only clarification prompt at block 258 based on the quantity or frequency of the NL only clarification prompt failing, e.g., indicating that users do not understand the options presented, do not understand how to select an option presented, or are annoyed or bored by the content or format of the prompt.

In some implementations, determining to provide the enhanced clarification prompt in lieu of the NL only clarification prompt quantity is based on the quantity and/or frequency, of the NL only clarification prompt failing, satisfying threshold(s). In some of those implementations, the threshold(s) can be dependent on which computational resources and/or other resources would be consumed as a result of an errant performance of the wrong action due to user misunderstanding of an NL only clarification prompt and/or an extent of utilization of such resource(s). For example, a less stringent threshold (i.e., more likely to result in an enhanced clarification prompt being provided) can be utilized if the actions being disambiguated would each lead to three or more minutes of audio being streamed and rendered, whereas a more stringent threshold can be utilized if the actions being disambiguated would each only lead to less than ten seconds of audio being streamed and rendered. As another example, a less stringent threshold can be utilized if one or more of the actions being disambiguated would lead to a purchase (that may not be reversible, or would be computationally burdensome to reverse), whereas a more stringent threshold can be utilized if none of the actions being disambiguated would lead to a purchase.

More generally, determining whether to provide an enhanced clarification prompt in lieu of an NL only clarification prompt can be based on which computational resources and/or other resources would be consumed as a result of an errant performance of the wrong action due to user misunderstanding of the NL only clarification prompt and/or an extent of utilization of such resource(s). As one example, enhanced clarification prompts may not even be considered for NL only prompts where errant performance of the wrong action would not lead to a purchase and/or would result in less than a threshold extent of usage of network resources. As another example, an enhanced clarification prompt can be provided in lieu of a first NL only clarification prompt that includes rare term(s) based on the first NL only clarification prompt disambiguating between two computationally burdensome actions, but not provided in lieu of a second NL only clarification prompt that also includes the rare term(s) based on the second NL only clarification prompt disambiguating between two non-computationally burdensome actions. As yet another example, assume an NL only clarification prompt of "The one by the Firefighters or the one by Arkansas Vegas?". An enhanced clarification prompt can be provided in lieu of the NL only clarification prompt in response to user input of "Play Boxanne" since the resulting actions (playing a first song or playing a second song) both involve streaming and rendering of a large amount of audio data. On the other hand, the NL only clarification prompt can be provided in response to user input of "Boxanne lyrics" since the resulting actions (transmitting and rendering lyrics for the first song or the second song) involve transmitting a smaller amount of data and/or rendering the data for a shorter duration.

At block 259C the system classifies the spoken utterance as being spoken by a particular user account or particular user associated with a particular account. The system can associate the spoken utterance with the user account based on a voice recognition profile of the user associated with the user account by performing voice recognition processing on audio data including the spoken utterance. In some implementations, the system can attribute the spoken utterance to the particular user or user account based on historical automated assistant interaction data that indicates receipt of the spoken utterance is likely associated with that user and/or account. For example, the historical automated assistant interaction data may indicate that the assistant device that received the spoken utterance has been mainly, only, or most recently used by a particular user or account. In some implementations, the system can classify the spoken utterance as being spoken by a particular user account or particular user associated with a particular account based on sensor data of the assistant device that is in addition to the audio sensor data capturing the spoken utterance. For example, the system may classify the utterance as being spoken by the particular user/account based on comparing vision sensor data to one or more facial recognition profiles associated with the assistant device or based on detecting nearby devices associated with the user/account using Bluetooth, ultrasonic audio, and/or Wi-Fi.

Block 259C can include sub-block 259C1. At sub-block 259C1, the system identifies attributes associated with the particular user account or particular user associated with a particular account. The attributes can include user settings, user preferences, the user device(s) associated with the automated assistant system, automated assistant features enabled for or used by the user, and applications installed on the user device(s). In some implementations, the attributes can include an age of the user or a language ability of the user. For example, the attributes may indicate that a particular user who provided the spoken utterance is a child with a fifth-grade reading level. The system can then determine to provide the enhanced clarification prompt rather than the NL only clarification prompt at block 258 based on the attributes and/or other data associated with the user or user account indicating that the enhanced clarification prompt may be more appropriate for the user, e.g., based on a user's abilities and familiarity with certain features of the clarification prompt(s).

In some implementations, the attributes can be identified by performing voice recognition on the audio data including the spoken utterance and identifying attributes stored in association with a user account profile that includes a voice recognition profile for the particular user. In some implementations, the attributes can be identified by processing the historical automated assistant interaction data and/or comparing the historical automated assistant interaction data to historical automated assistant interaction data of other users of other devices. For example, the system may compare the spoken utterances, requests, and responses of a user during a given type of human-to-computer dialog session to the spoken utterances, requests, and responses of a plurality of other users in the same or similar types of human-to-computer dialog sessions who each have user attributes stored in association with their user account profiles. Based on this comparison, the system can assign certain attributes to a user or user account.

For example, the system can determine to provide the enhanced clarification prompt rather than the NL only clarification prompt at block 258 based on the attributes associated with the user/account indicating that the user one or more familiarity measures indicating proficiency with musical, cinematic, sports, etc. domains fail to satisfy one or more thresholds. The familiarity measure(s) failing to satisfy the corresponding threshold(s) may indicate that the user may have difficulty identifying or recognizing descriptors for candidate responsive actions related to that domain. In such an example, the system may have assigned these low levels of proficiency to a user based on recognizing that the user inaccurately describes or infrequently requests actions that correspond to each proficiency category.

As another example, in keeping with the "how tall is a crane?" example above, an NL only clarification prompt from the system may include audio data imitating the natural language question "Do you mean the machinery or the Gruiform?". Whereas, for such an example, an enhanced clarification prompt may include the question "Which type of crane did you mean?" with an image of the industrial equipment called a crane and an image of the long-necked bird called a crane displayed on a display of the assistant device. For such an example, the system can determine, at block 258, to provide the enhanced clarification prompt including the images rather than providing the NL only clarification prompt based on determining that the user's age and/or language abilities are associated with: historically better rates of success or responsiveness to enhanced clarification prompts in general compared to NL only clarification prompts in general, historically better rates of success or responsiveness to similar enhanced clarification prompts compared to similar NL only clarification prompts, relative low ability to understand or repeat the terms to be included in the NL only clarification prompt, relatively short attention span, etc. The system may have made such determinations about associations with a user's age and/or language abilities based on analyzing historical automated assistant interaction data for a plurality of users with similar ages and/or language abilities.

At block 259D, the system compares one or more first term(s) of the NL only clarification prompt that characterize a first candidate responsive action to one or more second term(s) of the NL only clarification prompt that characterize a second candidate responsive action. As discussed herein, the NL only clarification prompts can include slots filled by the natural language characterizations of the candidate responsive actions to be rendered in the prompt. Each natural language characterization for a candidate responsive action can include one or more terms describing that candidate responsive action.

Block 259D can include one or more of sub-blocks 259D1 and 259D2. At sub-block 259D1, the system determines a similarity measure that reflects a textual and/or semantic similarity between the first term(s) and the second term(s). At sub-block 259D2, the system can embed the first term(s) as a first embedding in an embedding space and can embed the second term(s) as a second embedding in the embedding space using a trained encoder (e.g., a trained neural network embedding model). In some implementations, the system can use the embeddings of sub-block 259D2 to generate the similarity measure of sub-block 259D1.

The system can thus determine to provide the enhanced clarification prompt rather than the NL only clarification prompt at block 258 based on the comparison(s) of the embeddings of the first and second terms and/or based on the similarity measure. For example, in requesting for the user to clarify which version of a song they are attempting to play, the system may determine to play representative audio snippets of the song versions rather than render an NL only clarification prompt based on the available descriptors of the song versions being too semantically similar, e.g., "House music" and "Electronic Dance music", or too semantically dissimilar, potentially indicating that the descriptors are unrelated or otherwise not comparable, e.g., "released in 1999" and "up-tempo". The system may determine the descriptors are too semantically similar/dissimilar based on analyzing the distance between the embeddings for the first term(s) and the second term(s). Thus, at block 258, the system may determine to provide the enhanced clarification prompt rather than the NL only clarification prompt based on determining that the similarity measure and/or embeddings indicate threshold level(s) of similarity and/or dissimilarity.

In some of the implementations of FIG. 3 in which the NL only clarification prompt template(s) and/or natural language characterizations of the candidate responsive actions have previously been generated, for this user or for another user as indicated by the historical automated assistant interaction data, one or more of these example implementations of block 258 of FIG. 2 may be performed prior to the system receiving the audio data that captures the spoken utterance of the user at block 252 of FIG. 2. In such implementations, the system may store the result(s) of one or more of blocks 259A-259D in one or more databases accessible to the system, and the system may reference the result(s) of the database in performing block 258.

Figure 4:
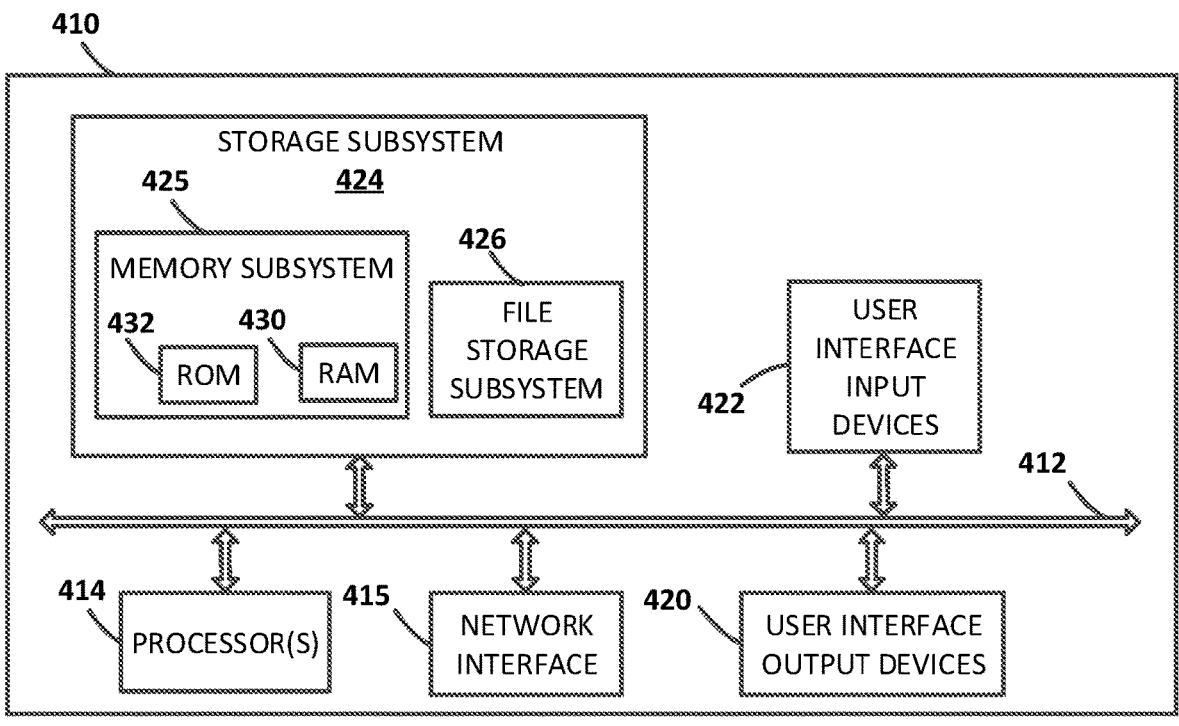
FIG. 4 illustrates an example architecture of a computing device.

FIG. 4 is a block diagram of an example computing device 410 that may optionally be utilized to perform one or more aspects of techniques described herein. In some implementations, one or more of a client computing device, and/or other component(s) may include one or more components of the example computing device 410.

Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of one or more of the methods described herein, and/or to implement various components depicted herein.

These software modules are generally executed by processor 414 alone or in combination with other processors. Memory 425 used in the storage subsystem 424 can include a number of memories including a main random access memory ("RAM") 430 for storage of instructions and data during program execution and a read only memory ("ROM") 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by processor(s) is provided that includes receiving audio data that captures a spoken utterance of a user. The method further includes generating, based on processing the audio data, a recognition that corresponds to the spoken utterance captured in the audio data. The method further includes determining, based on processing the recognition, that the spoken utterance is ambiguous. Determining that the spoken utterance is ambiguous includes determining that the recognition is interpretable as requesting performance of a first particular action exclusively and is also interpretable as requesting performance of a second particular action exclusively. The method further includes, in response to determining that the spoken utterance is ambiguous: determining to provide an enhanced clarification prompt that renders output that is in addition to natural language. The enhanced clarification prompt solicits further user interface input for disambiguating between the first particular action and the second particular action. Determining to provide the enhanced clarification prompt includes a current or prior determination to provide the enhanced clarification prompt instead of a natural language (NL) only clarification prompt that is restricted to rendering natural language. The method further includes causing the clarification prompt to be rendered at the assistant device.

The foregoing and other implementations disclosed herein can each optionally include one or more of the following features, alone or in combination.

In some implementations, the current or prior determination to provide the enhanced clarification prompt instead of the NL only clarification prompt can be a prior determination. In some of those implementations, the method further includes determining, prior to receiving the audio data, to provide the enhanced clarification prompt instead of the NL only clarification prompt.

In some implementations, determining to provide the enhanced clarification prompt instead of the NL only clarification prompt includes: determining, based on analysis of historical automated assistant interaction data, a failure metric for the NL only clarification prompt; determining that the failure metric satisfies a threshold; and in response to determining that the failure metric satisfies the threshold: modifying data at one or more automated assistant servers to cause the NL only clarification prompt to be supplanted by the enhanced clarification prompt. In some versions of those implementations, determining the failure metric includes: determining, from the historical automated assistant interaction data, a quantity of occurrences of non-clarifying user input and/or of no user input responsive to prior automated assistant renderings that correspond to the clarification prompt. In some additional or alternative implementations, the clarification prompt is generated based on a clarification template and the prior automated assistant renderings that correspond to the clarification prompt include renderings of the clarification prompt and include renderings of additional clarification prompts that are also generated based on the clarification template. In some such implementations, the prior automated assistant renderings that correspond to the clarification prompt consist of renderings of the clarification prompt. In some additional or alternative implementations, the method further includes determining the threshold based on one or more first properties of the first action and/or based on one or more properties of the second action. In some of those additional or alternative implementations, the one or more first properties reflect computational and/or network burden of the first action and/or whether the first action results in a purchase.

In some implementations, the current or prior determination to provide the enhanced clarification prompt instead of the NL only clarification prompt is a current determination. In some versions of those implementations, the method further includes: generating the NL only clarification prompt, where the NL only clarification prompt includes one or more first terms that are descriptive of the first action and one or more second terms that are descriptive of the second action; comparing the one or more first terms to the one or more second terms; and determining, based on the comparing, to provide the enhanced clarification prompt instead of the NL only clarification prompt. In some versions of those implementations, comparing the one or more first terms to the one or more second terms includes generating a similarity measure that reflects textual and/or semantic similarity between the one or more first terms and the one or more second terms and determining, based on the comparing, to provide the enhanced clarification prompt instead of the NL only clarification prompt, includes determining that the similarity measure indicates at least a threshold degree of similarity. In some of those versions, generating the similarity measure includes: processing the one or more first terms, utilizing a trained encoder, to generate a first embedding; processing the one or more second terms, utilizing a trained encoder, to generate a second embedding; and generating the similarity measure based on a distance, in embedding space, between the first embedding and the second embedding. In some additional or alternative implementations, the method further includes determining the threshold degree of similarity based on one or more first properties of the first action and/or based on one or more properties of the second action. In some of those additional or alternative implementations, the one or more first properties reflect computational and/or network burden of the first action and/or whether the first action results in a purchase.

In some implementations, the current or prior determination to provide the enhanced clarification prompt instead of the NL only clarification prompt is a current determination, and the method further includes: generating the NL only clarification prompt, where the NL only clarification prompt includes one or more first terms that are descriptive of the first action; determining that a frequency, of at least one of the first terms and across a corpus of documents, fails to satisfy a threshold frequency; and determining, based on the frequency failing to satisfy the threshold frequency, to provide the enhanced clarification prompt instead of the NL only clarification prompt. In some additional or alternative implementations, the method further includes determining the threshold frequency based on one or more first properties of the first action and/or based on one or more properties of the second action. In some of those additional or alternative implementations, the one or more first properties reflect computational and/or network burden of the first action and/or whether the first action results in a purchase.

In some implementations, the current or prior determination to provide the enhanced clarification prompt instead of the NL only clarification prompt is a current determination, and the method further includes: classifying, based on processing the audio data or additional sensor data captured at the assistant device, the spoken utterance as being spoken by a particular user account; and determining, based on one or more attributes stored in association with the particular user account, to provide the enhanced clarification prompt instead of the NL only clarification prompt. In some versions of those implementations, the first particular action is causing rendering of a first song, the second particular action is causing rendering of a second song that is distinct from the first song, the one or more attributes reflect a musical proficiency measure of the user, and determining to provide the enhanced clarification prompt instead of the NL only clarification prompt based on the one or more attributes includes: selecting the enhanced clarification prompt in response to the familiarity measure failing to satisfy a threshold that indicates a threshold degree of musical proficiency. In some other versions of those implementations, the one or more attributes reflect an age category of the user, and determining to provide the enhanced clarification prompt instead of the NL only clarification prompt based on the one or more attributes includes: selecting the enhanced clarification prompt in response to the age category being a particular category. In some of these implementations, the output rendered by the enhanced clarification prompt can include one or more images.

In some implementations, the first particular action is causing rendering of a first song, the second particular action is causing rendering of a second song that is distinct from the first song, and the output rendered by the enhanced clarification prompt includes a snippet from the first song and a snippet from the second song.

In some implementations, the method further includes receiving further user input responsive to rendering of the clarification prompt; processing the further user input to determine to perform the first particular action instead of the second particular action; and causing performance of the first particular action. In some versions of those implementations, the output rendered by the enhanced clarification prompt includes a first portion that includes one or both of a first image corresponding to the first action and a first musical snippet corresponding to the first action and a second portion that includes one or both of a second image corresponding to the second action and a second musical snippet corresponding to the second action. The first portion is rendered temporally before the second portion, the further user input is a further spoken utterance that references a temporal position, and processing the further user input to determine to perform the first particular action instead of the second particular action includes determining to perform the first action based on determining that the temporal position, referenced by further spoken utterance, corresponds to the rendering of the first portion. In some other versions of those implementations, the output rendered by the enhanced clarification prompt includes a first portion that includes a first musical snippet corresponding to the first action and a second portion that includes a second musical snippet corresponding to the second action, the further user input is a further spoken utterance that references a musical property, and processing the further user input to determine to perform the first particular action instead of the second particular action includes determining the musical property, referenced in the further spoken utterance, matches the first musical snippet and does not match the second musical snippet. In some of those other versions, determining the musical property matches the first musical snippet and does not match the second musical snippet includes comparing the musical property to first metadata for the first musical snippet and to second metadata for the second musical snippet. In yet other versions of those implementations, the output rendered by the enhanced clarification prompt includes a first image corresponding to the first action and a second image corresponding to the second action visually rendered at the same time, the further user input is a touch input being directed at the first image, and processing the further user input to determine to perform the first particular action instead of the second particular action includes determining to perform the first particular action based on the touch input being directed to the first image that corresponds to the first action.

Other implementations may include a non-transitory computer-readable storage medium storing instructions executable by one or more processors (e.g., central processing unit(s) (CPU(s)), graphics processing unit(s) (GPU(s)), and/ or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

What is claimed is:

1. A method implemented by one or more processors, the method comprising:

processing audio data that is detected via one or more microphones of an automated assistant device and that captures a user utterance;

identifying, based on the processing of the audio data, one or more words corresponding to the user utterance;

determining, based on processing the words corresponding to the user utterance, that the words correspond both with initiation of a first particular action exclusively and with initiation of a second particular action exclusively;

classifying, based on processing the audio data or additional sensor data captured at the automated assistant device, the user utterance as corresponding to a particular user account;

in response to determining that the words correspond both with initiation of the first particular action exclusively and with the second particular action exclusively:

determining whether, in soliciting further user interface input for disambiguating between the first particular action and the second particular action, to provide a natural language (NL) only clarification prompt that is restricted to rendering NL, or to instead provide an enhanced clarification prompt that renders NL and renders output that is in addition to NL, wherein determining whether to provide the NL only clarification prompt or to instead provide the enhanced clarification prompt is based on one or more attributes stored in association with the particular user account and is based on the one or more attributes in response to classifying the user utterance as corresponding to the particular user account, wherein the one or more attributes reflect a familiarity measure of the user, and wherein determining whether to provide the NL only clarification prompt or to instead provide the enhanced clarification prompt comprises: determining to provide the NL only clarification prompt when the familiarity measure of the user is a first familiarity measure, and determining to provide the enhanced clarification prompt when the familiarity measure of the user is a second familiarity measure; and causing the determined one of the NL only clarification prompt or the enhanced clarification prompt to be rendered at the assistant device.

2. The method of claim 1, wherein determining whether to provide the NL only clarification prompt, or to instead provide the enhanced clarification prompt, is performed prior to processing the audio data.

3. The method of claim 1, wherein determining whether to provide the NL only clarification prompt, or to instead provide the enhanced clarification prompt further comprises:

identifying, based on analysis of historical automated assistant interaction data, a failure metric for the NL only clarification prompt; and determining whether the failure metric satisfies a threshold.

4. The method of claim 3, wherein determining the failure metric comprises:

determining, from the historical automated assistant interaction data, a quantity of occurrences of non-clarifying user input and/or of no user input responsive to prior automated assistant renderings that correspond to the NL only clarification prompt.

5. The method of claim 4, wherein the NL only clarification prompt is generated based on a clarification template, and wherein the prior automated assistant renderings that correspond to the NL only clarification prompt comprise renderings of the NL only clarification prompt and renderings of additional prompts that are also generated based on the clarification template.

6. The method of claim 4, wherein the prior automated assistant renderings that correspond to the NL only clarification prompt consist of renderings of the NL only clarification prompt.

7. The method of claim 1, determining that a frequency, of at least one or more terms of the NL only clarification prompt and across a corpus of documents, fails to satisfy a threshold frequency;

wherein determining whether to provide the NL only clarification prompt or the enhanced clarification prompt is further based on the frequency failing to satisfy the threshold frequency.

8. The method of claim 1, wherein the output, of the enhanced clarification prompt, comprises one or more images.

9. The method of claim 1, further comprising:

receiving further user input responsive to the rendering of the determined one of the NL only clarification prompt or the enhanced clarification prompt;

processing the further user input to determine to initialize the first particular action instead of the second particular action; and causing initialization of the first particular action.

10. The method of claim 9, wherein the output of the enhanced clarification prompt comprises:

a first portion comprising one or both of a first image and a first audible output corresponding to the first particular action, and a second portion comprising one or both of a second image and a second audible output corresponding to the second particular action, wherein the first portion is rendered temporally before the second portion;

wherein the further user input is a spoken utterance that references a temporal position; and wherein processing the further user input to determine to perform the first particular action instead of the second particular action comprises determining to perform the first particular action based on determining that the temporal position, referenced by the spoken utterance, corresponds to the rendering of the first portion.

11. The method of claim 9, wherein the output of the enhanced clarification prompt comprises:

a first image corresponding to the first particular action, and a second image corresponding to the second particular action, wherein the first image and the second image are visually rendered at the same time;

wherein the further user input is a touch input being directed at the first image; and wherein processing the further user input to determine to perform the first particular action instead of the second particular action comprises determining to perform the first particular action based on the touch input being directed to the first image that corresponds to the first particular action.

12. A system comprising:

one or more computers and one or more storage devices storing instructions that are operable, when executed by the one or more computers, to cause the one or more computers to perform operations comprising:

processing audio data that is detected via one or more microphones of an automated assistant device and that captures a user utterance;

identifying, based on the processing of the audio data, one or more words corresponding to the user utterance;

determining, based on processing the words corresponding to the user utterance, that the words correspond both with initiation of a first particular action exclusively and with initiation of a second particular action exclusively;

in response to determining that the words correspond both with initiation of the first particular action exclusively and with the second particular action exclusively:

determining whether, in soliciting further user interface input for disambiguating between the first particular action and the second particular action, to provide a natural language (NL) only clarification prompt that is restricted to rendering NL, or to instead provide an enhanced clarification prompt that renders NL and renders output that is in addition to NL, wherein determining whether to provide the NL only clarification prompt, or to instead provide the enhanced clarification prompt is based on one or more attributes stored in association with the particular user account and is based on the one or more attributes in response to classifying the user utterance as corresponding to the particular user account, wherein the one or more attributes reflect a language ability category of the user, and wherein determining whether to provide the NL only clarification prompt or to instead provide the enhanced clarification prompt comprises:

determining to provide the NL only clarification prompt when the language ability category of the user is a first language ability category, and determining to provide the enhanced clarification prompt when the language ability category of the user is a second language ability category; and causing the determined one of the NL only clarification prompt or the enhanced clarification prompt to be rendered at the assistant device.

13. The system of claim 12, wherein determining whether to provide the NL only clarification prompt, or to instead provide the enhanced clarification prompt, is performed prior to processing the audio data.

14. The system of claim 12, wherein the NL only clarification prompt is generated based on a clarification template, and wherein the prior automated assistant renderings that correspond to the NL only clarification prompt comprise renderings of the NL only clarification prompt and renderings of additional prompts that are also generated based on the clarification template.

15. The system of claim 12, wherein the prior automated assistant renderings that correspond to the NL only clarification prompt consist of renderings of the NL only clarification prompt.

16. A non-transitory computer-readable medium storing software comprising instructions executable by one or more computers which, upon such execution, cause the one or more computers to perform operations comprising:

processing audio data that is detected via one or more microphones of an automated assistant device and that captures a user utterance;

identifying, based on the processing of the audio data, one or more words corresponding to the user utterance;

determining, based on processing the words corresponding to the user utterance, that the words correspond both with initiation of a first particular action exclusively and with initiation of a second particular action exclusively;

classifying, based on processing the audio data or additional sensor data captured at the automated assistant device, the user utterance as corresponding to a particular user account;

in response to determining that the words correspond both with initiation of the first particular action exclusively and with the second particular action exclusively:

determining whether, in soliciting further user interface input for disambiguating between the first particular action and the second particular action, to provide a natural language (NL) only clarification prompt that is restricted to rendering NL, or to instead provide an enhanced clarification prompt that renders NL and renders output that is in addition to NL, wherein determining whether to provide the NL only clarification prompt or to instead provide the enhanced clarification prompt is based on one or more attributes stored in association with the particular user account and is based on the one or more attributes in response to classifying the user utterance as corresponding to the particular user account, wherein the one or more attributes reflect a familiarity measure of the user, and wherein determining whether to provide the NL only clarification prompt or to instead provide the enhanced clarification prompt comprises:

determining to provide the NL only clarification prompt when the familiarity measure of the user is a first familiarity measure, and determining to provide the enhanced clarification prompt when the familiarity measure of the user is a second familiarity measure; and causing the determined one of the NL only clarification prompt or the enhanced clarification prompt to be rendered at the assistant device.

\* \* \* \* \*